7929X
C. M. KING.
Carriage-Step.
Patented Dec. 31, 1833.
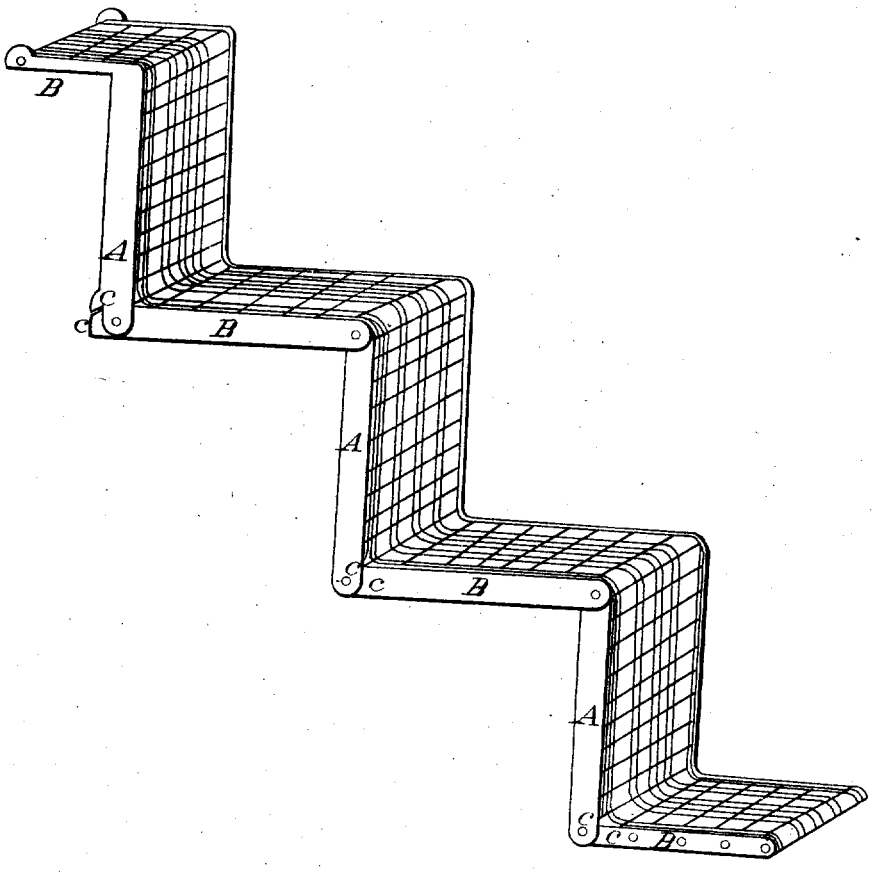
AM. PHOTO-LITHO. CO. N. Y. (OSBORNE'S PROCESS.)

7929X

Dec 31. 1839 | 597

Charles M. King Newark N. J.

Letters Patent

The schedule referred to in these Letters Patent and making part of the same
Containing a description in the words of the said Charles M. King himself of
his improvement in Coach Steps.....

To all to whom these presents shall come Be it known that I Charles M.
King of Newark in the County of Essex and State of New Jersey have inven
-ted a new and useful improvement in the form of Coach Steps and that
the following is a full and exact description of the Construction and operation
of the said improvement as invented or improved by me.

My improvement in the form of Coach Steps is in
tended and calculated to add to their strength and durability. This is effected
by giving the joints exposed to the greatest strain a double bearing. When a step
of usual form is unfolded for use a single projection on one end of each side
piece is its only support to keep the several parts in their proper position and to
bear the weight of the person using it. And as this support is necessarily very near
the Centre of the joint and the weight on the step frequently very considerable
these projections are very liable to be broken off which renders the steps useless. In
addition to the projections or bearings along the back ends of the horizontal side
pieces of the upper steps which rest against the back edges of the perpendicular
pieces to which they are attached, I propose to make strong projections from the
back edges of the perpendicular parts to receive the upper ones of the projections
on the horizontal pieces which will render it impossible for the steps to give way
unless both bearings should break off at the same time; this form will more
than double the strength of the joint without adding any [illegible] [illegible] to the
labor of making it, or to its weight. The middle and lower joints are strengthened
in the same way only the second bearings at these joints are on the horizontal pieces
What I claim as my invention and for which I ask a Patent is the projections or bear
ings on the edges of the lateral pieces of the steps, that being the only thing in which they
differ from those in common use. Dated Newark 1st December 1838

Witnesses Wm [illegible] } Chas M. King
Stephen Dod }

[illegible]

[illegible] 1839